(12) United States Patent
Strauch et al.

(10) Patent No.: US 7,778,854 B2
(45) Date of Patent: Aug. 17, 2010

(54) SYSTEM AND METHOD FOR MANAGING CHANNEL PARTNER RESPONSIBILITIES

(75) Inventors: Oliver G. Strauch, Schwetzingen (DE); Alexander Kuschner, Heidelberg (DE); Hermann J. Duengelhoef, Mannheim (DE); Bernhard M. Hartenstein, Angelbachtal (DE)

(73) Assignee: SAP AG, Walldorf (DE)

( * ) Notice: Subject to any disclaimer, the term of this patent is extended or adjusted under 35 U.S.C. 154(b) by 762 days.

(21) Appl. No.: 11/247,773

(22) Filed: Oct. 12, 2005

(65) Prior Publication Data

US 2006/0259343 A1    Nov. 16, 2006

Related U.S. Application Data

(60) Provisional application No. 60/680,513, filed on May 13, 2005.

(51) Int. Cl.
  *G06F 9/44* (2006.01)
(52) U.S. Cl. .......................................................... 705/7
(58) Field of Classification Search ..................... 705/7
  See application file for complete search history.

(56) References Cited

U.S. PATENT DOCUMENTS

| | | | | | |
|---|---|---|---|---|---|
| 5,765,138 | A | * | 6/1998 | Aycock et al. | 705/7 |
| 7,039,606 | B2 | * | 5/2006 | Hoffman et al. | 705/26 |
| 7,054,837 | B2 | * | 5/2006 | Hoffman et al. | 705/28 |
| 7,120,596 | B2 | * | 10/2006 | Hoffman et al. | 705/28 |
| 7,315,826 | B1 | * | 1/2008 | Guheen et al. | 705/7 |
| 7,346,527 | B2 | * | 3/2008 | McKay et al. | 705/7 |
| 7,657,436 | B2 | * | 2/2010 | Elmore et al. | 705/26 |
| 2001/0013004 | A1 | * | 8/2001 | Haris et al. | 705/1 |
| 2002/0107761 | A1 | * | 8/2002 | Kark et al. | 705/27 |
| 2002/0161766 | A1 | * | 10/2002 | Lawson et al. | 707/9 |
| 2002/0178049 | A1 | * | 11/2002 | Bye | 705/11 |
| 2003/0055704 | A1 | * | 3/2003 | Reece | 705/9 |
| 2003/0212604 | A1 | * | 11/2003 | Cullen, III | 705/26 |
| 2004/0162753 | A1 | * | 8/2004 | Vogel et al. | 705/10 |
| 2005/0108043 | A1 | * | 5/2005 | Davidson | 705/1 |
| 2006/0259337 | A1 | * | 11/2006 | Bierbaum et al. | 705/7 |

OTHER PUBLICATIONS

Gunasekaren et al "Modelling and Analysis of Supply Chain Management Systems: An Editorial Overview", Dec. 2000, Journsal of the Operational research Society, pp. 1-5.*

(Continued)

*Primary Examiner*—Romain Jeanty
(74) *Attorney, Agent, or Firm*—Kenyon & Kenyon LLP

(57) ABSTRACT

A system and method for managing channel partner responsibilities. According to an embodiment, an application receives an assignment of a responsibility to a channel partner or the channel partner's employees and assigns the responsibility thereto. According to another embodiment, an application receives a command by the brand owner to search for a channel partner or channel partner's employee based on responsibility data of the channel partner or the channel partner's employees, generates a search rule based on the command, executes the search rule in order to perform the search, and provides results of the search to the brand owner. According to another embodiment, in response to a command, an application searches a database for a channel partner to perform a job, selects a channel partner to perform the job whose responsibilities most closely match the job, and automatically dispatches the job to the selected channel partner. According to yet another embodiment, a data structure comprises one or more data elements identifying a responsibility associated with the channel partner or the channel partner's employees.

15 Claims, 11 Drawing Sheets

OTHER PUBLICATIONS

Clark et al "Web-based B2B portals", Jan. 2003, Marketing Program, College of Business, James Madison University, MSC 0206, ZSH 643, pp. 1-8.*

Web "Managing channels of distribution in the age of electronic commerce", Mar. 2001, Department of marketing. E Claiborne Robins School of Business, University of Richmond, p. 1-8.*

* cited by examiner

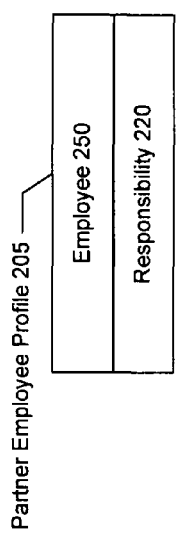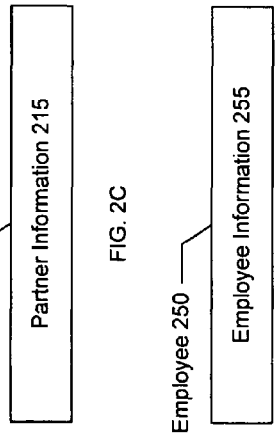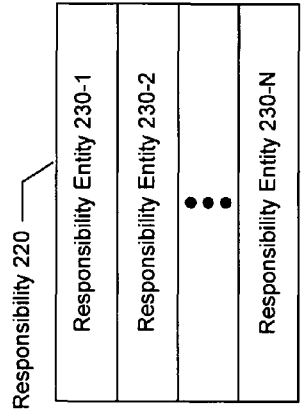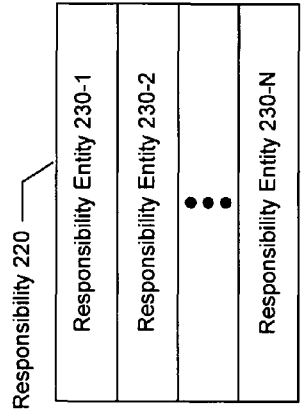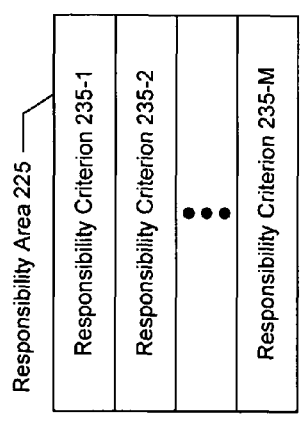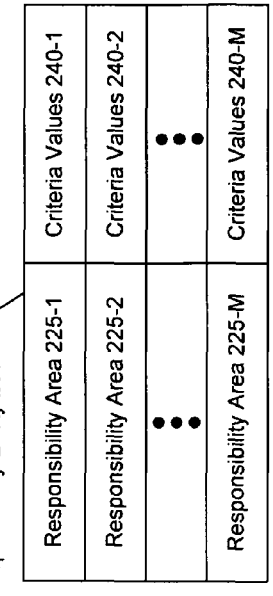
DATA STRUCTURES

FIG. 3B

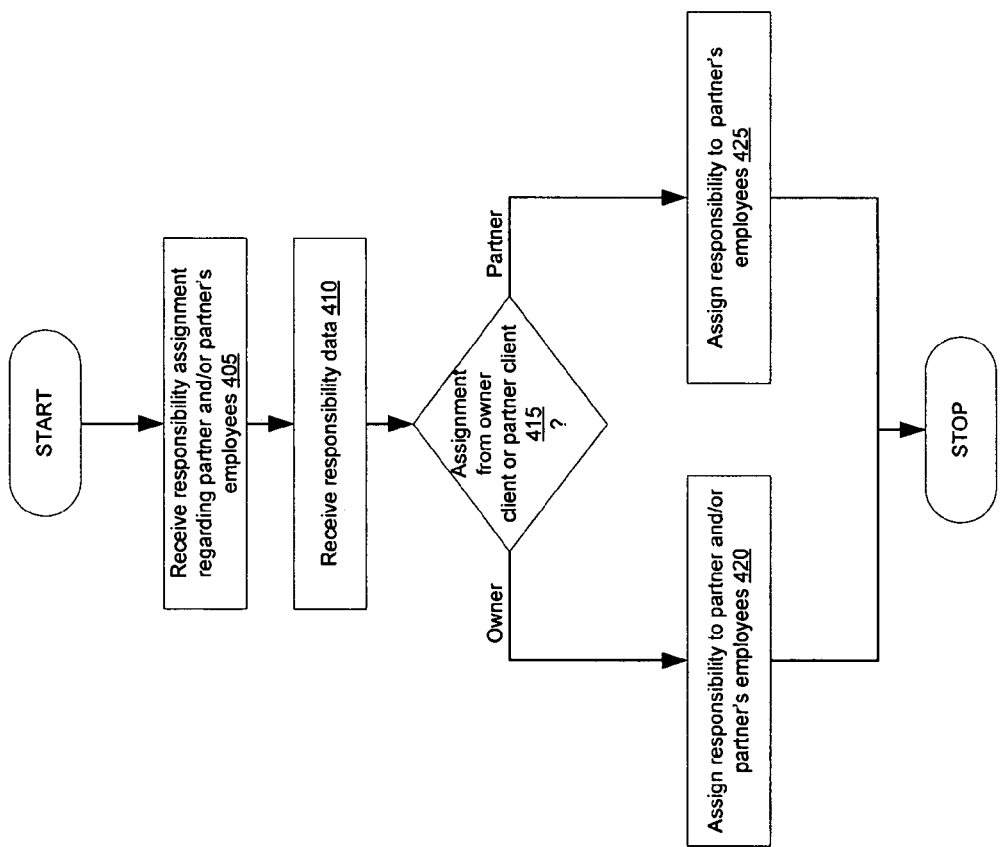

SYSTEM AND METHOD FOR MANAGING CHANNEL PARTNER RESPONSIBILITIES

CROSS REFERENCE TO RELATED APPLICATIONS

This application claims priority under 35 U.S.C. 119(e) to U.S. Provisional Application No. 60/680,513, filed May 13, 2005.

BACKGROUND OF THE INVENTION

Channel management solutions (such as mySAP CRM Channel Management) are computer applications that allow brand owners to manage their indirect partner channel, i.e., independently operating external business partners, known as channel partners, that market, sell, and/or service the brand owner's products. For those channel partners, a partner portal provides access to data and processes of the brand owner's Customer Relationship Management ("CRM") system.

Prior to the present invention, however, it has not been possible to store information about a channel partner's and the channel partner's individual employees' responsibilities. Because of this, brand owners have not been able to (a) model a channel partner's and the channel partner's employees' responsibilities and (b) find the best-fit channel partner and channel partner's employee for a "job" (e.g., processing a forwarded sales lead or opportunity), according to their responsibilities.

A responsibility may be anything business-related that the channel partner and/or employee are assigned to do or are accountable for. For example, a channel partner's responsibility may be to sell widgets in the Northwest U.S., to handle distribution of widgets in Australia, to contact potential buyers of widgets in Europe, etc. A channel partner's employee's responsibility may be to handle accounting for the channel partner's widget sales, to order widgets for the channel partner from the brand owner, etc.

There is a need in the art for a system and method for managing channel partner responsibilities.

BRIEF DESCRIPTION OF THE DRAWINGS

FIGS. 2A through 2G are block diagrams that depict data structures associated with responsibility assignments in accordance with an embodiment of the present invention.

FIG. 3B is a screenshot that depicts a responsibility area screen as viewed by a brand owner from which the brand owner may create responsibility areas made up of responsibility criteria in accordance with an embodiment of the present invention.

FIG. 4 is a flowchart of a method for assigning responsibilities in accordance with an embodiment of the present invention.

DETAILED DESCRIPTION

The present invention addresses the current drawbacks in channel management by providing for the assignment of responsibilities and their corresponding data to channel partners and their employees. Examples of responsibilities to be assigned according to embodiments of the present invention include, but are not limited to, a product category, a geographical sales area, a transaction type, etc., associated with the channel partner. Examples of responsibility data include product names, models, or properties; particular business locations, e.g., "eastern U.S." or "California"; whether the channel partner sells, markets, or services products; etc.

For example, the present invention enables brand owners to assign responsibilities pertaining to the channel partner's company and/or employees and enables channel partners to assign responsibilities pertaining to their employees. This allows the brand owner to effectively find the best-fit channel partner and/or employee based on responsibilities to perform a job for the brand owner. To do this, the brand owner can search a database for specific responsibilities associated with the job, thereby finding the channel partner and/or employee who has been assigned those responsibilities. The brand owner can then dispatch the job (e.g., forward a job order or a message to perform the job) to that channel partner and/or employee.

This efficient management of channel partners may be particularly important when there are a large number of jobs to be dispatched. As such, the brand owner need not spend valuable time dispatching the job to a channel partner who does not have the desired responsibility or, if the channel partner does have the desired responsibility, to the channel partner's employee who does not.

The dispatching of jobs to channel partners may be automatically carried out by the management system. In this case, the brand owner need not view the search results at all. Instead, the management system may dispatch the jobs to the best-fit channel partner and/or employee, based on the specific responsibilities associated with the job, as received from the brand owner.

Figure 1:
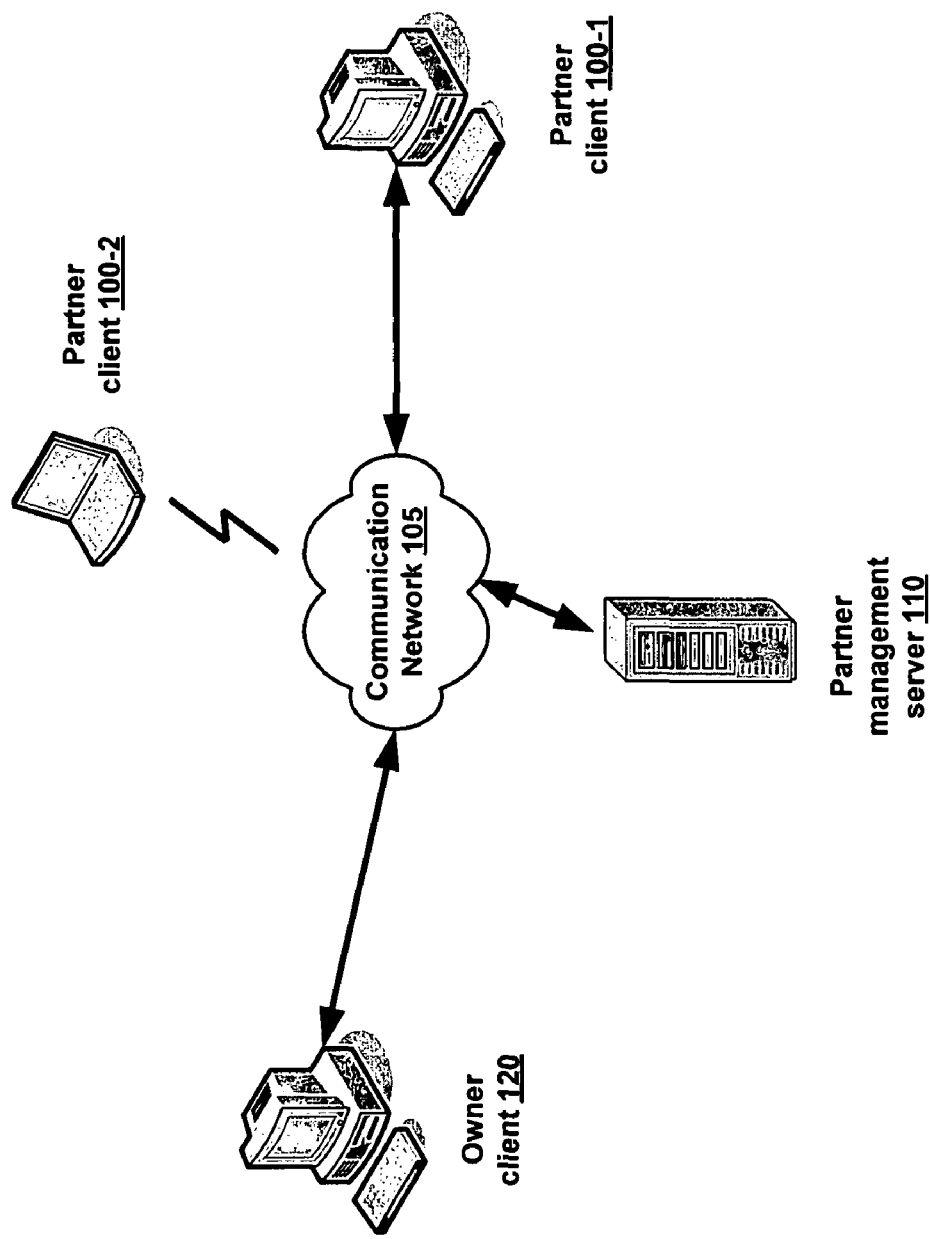
FIG. 1 is a system diagram in accordance with an embodiment of the present invention.

FIG. 1 is a diagram of a system for managing channel partner responsibilities in accordance with an embodiment of the present invention. In this embodiment, a channel partner may utilize partner client 100-1 or 100-2 to submit a responsibility assignment to partner management server 110, which is operated by a brand owner. Similarly, the brand owner may utilize owner client 120 to submit a responsibility assignment to partner management server 110. Server 110 may receive the responsibility assignment and associated responsibility data. Server 110 may then store the responsibility data of the channel partner in an entry (e.g., a data structure) in a database table resident therein. The assignment may be to change a responsibility previously assigned or to add a new responsibility to an entry associated with the channel partner, resulting in an update to a responsibility previously assigned or an addition of a new responsibility associated with the channel partner. Partner clients 100-1 and 100-2, owner client 120, and partner management server 110 may be connected via communication network 105.

It is to be understood that the system is not limited to that illustrated in FIG. 1, but may include any client devices, server devices, and transmission media capable of providing embodiments of the present invention.

FIGS. 2A-2G depict data structures that may be utilized in the implementation of partner responsibility management in accordance with an embodiment of the present invention. FIG. 2A illustrates a partner profile (data structure 200) in which responsibility information (data structure 220) may be associated with a channel partner (data structure 210). Similarly, FIG. 2B illustrates a partner employee profile (data structure 205) in which responsibility information (220) may be associated with an employee (data structure 250) of a channel partner. These associations enable server 110 to implement the responsibility assignments to be discussed below in reference to FIGS. 3-7 and the searching functionality to be discussed below in reference to FIGS. 8-9.

As shown in FIG. 2C, partner (data structure 210) may include partner information (data structure 215) that identifies the channel partner, e.g., the company name, address, telephone number, email address, etc. Similarly, in FIG. 2D, employee (250) may include employee information (data structure 255) that identifies the channel partner's employee, e.g., the employee's name, business address, business telephone number, business email address, etc.

As shown in FIG. 2E, responsibility information (220) may identify one or more responsibility entities (data structure 230). Each responsibility entity (230) may identify one or more responsibility areas (data structure 225), as shown in FIG. 2F, and criteria values (data structure 240) associated therewith. The responsibility entity (230) will be discussed more below with respect to FIG. 2G.

FIG. 2F shows a responsibility area (225), which may be used to group responsibility criteria (data structure 235). The responsibility criteria (235) are used to describe a channel partner's responsibilities. The responsibility areas (225) and the responsibility criteria (235) are independent of a particular channel partner. That is, the areas (225) and criteria (235) are not created specifically for particular channel partners. Rather, one or more of them may be assigned concrete criteria values (240) of a particular channel partner and may then automatically become a responsibility entity (230). This way, certain criteria (235) may be flexibly combined to make up an area (225) and certain areas (225) may be flexibly combined to represent a channel partner's responsibilities.

FIG. 2G shows a responsibility entity (230). One or more responsibility areas (225) made up of responsibility criteria (235) with corresponding criteria values (240) may become a responsibility entity (230). A channel partner or the channel partner's employees may possess one or more of these entities (230).

Figure 3A:
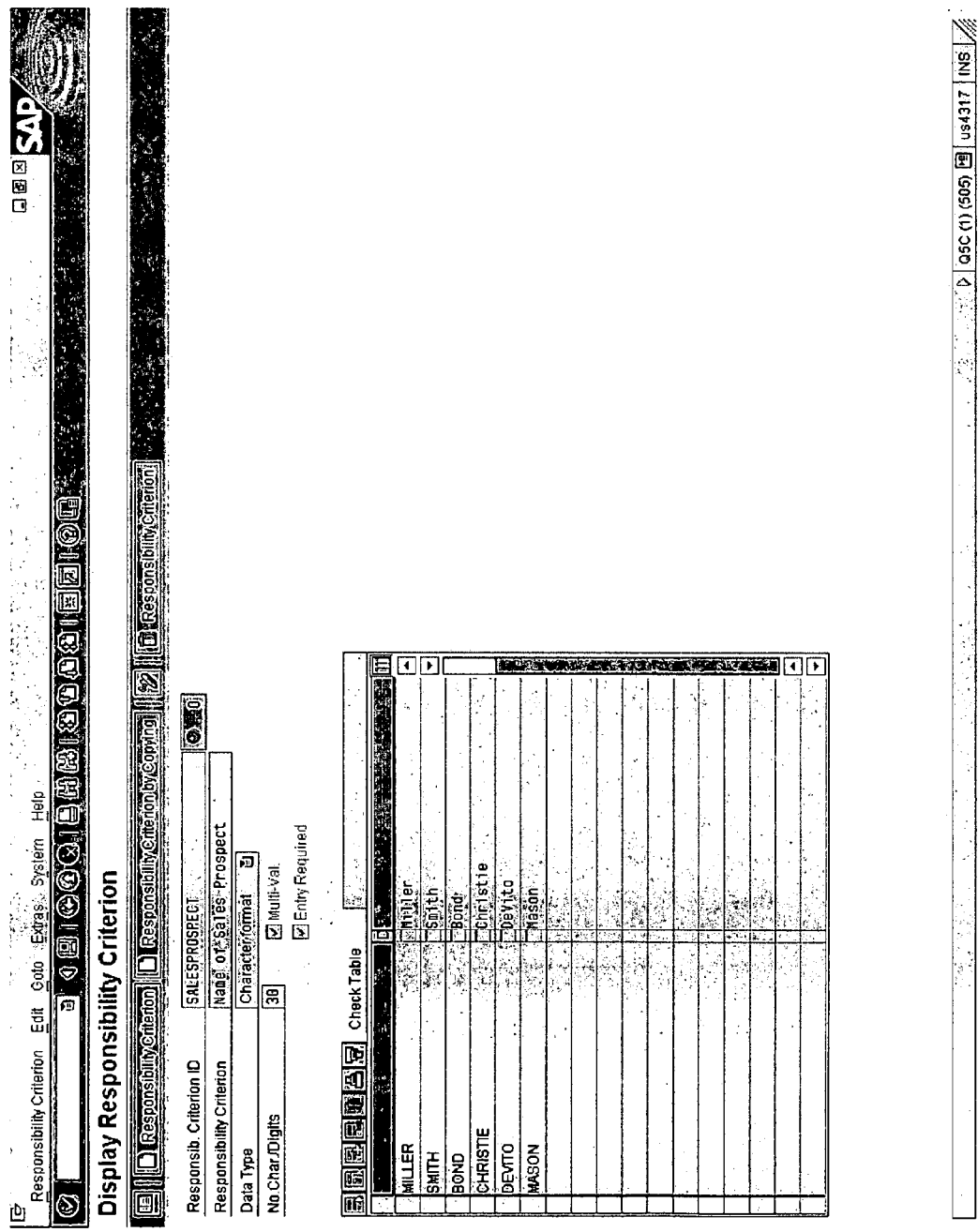
FIG. 3A is a screenshot that depicts a responsibility criterion screen as viewed by a brand owner from which the brand owner may create responsibility criteria in accordance with an embodiment of the present invention.

FIG. 3A is a screenshot that depicts a responsibility criterion screen as viewed by a brand owner in which the brand owner may create responsibility criteria (235). In this example, the brand owner creates a criterion for the name of the sales prospect. The brand owner may enter a responsibility criterion ID, the responsibility criterion label, the data type of the criterion, and the maximum number of criterion values that may be assigned.

If the brand owner wants the criterion to allow multiple values to be selected, the brand owner checks the "Multi-Val" box. For example, the brand owner includes six possible values from which a criterion value (240) may be assigned later with the criterion to become a responsibility entity of a particular channel partner. If selection of at least one criterion value is required for the criterion, the "Entry Required" box is checked.

After creating the responsibility criterion (235), the brand owner saves this criterion to the database for later use in creating responsibility areas (225) and responsibility entities (230).

Figure 3B:
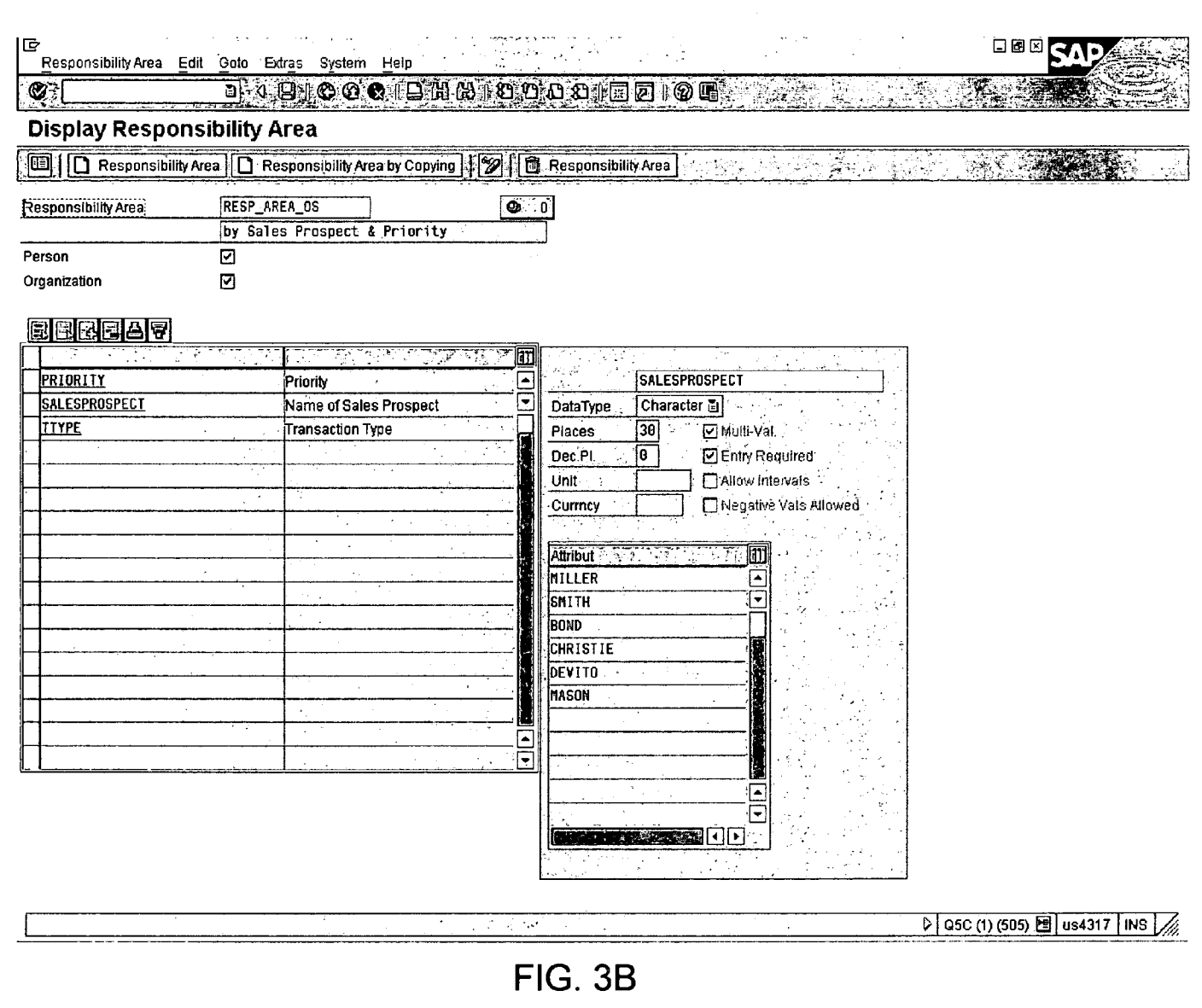

FIG. 3B is a screenshot that depicts a responsibility area screen as viewed by a brand owner in which the brand owner may create responsibility areas (225) made up of responsibility criteria (235). In this example, the brand owner assigns the responsibility criterion (235) shown in FIG. 3A with other responsibility criteria (235) to form a responsibility area (225). The responsibility area (225) may include a responsibility area ID, a responsibility area label, and a listing of the responsibility criterion IDs and labels that make up the responsibility area.

In this example, the brand owner may specify whether the responsibility area (225) may be assigned to a channel partner, the channel partner's employees, or both, by checking the "Person" box (for employees) and the "Organization" box (for channel partners).

Later, the brand owner may assign criteria values (240) to the criteria (235) that make up the responsibility area (225) to become a responsibility entity (230). For example, in FIG. 3B, the brand owner may select responsibility criterion "SALESPROSPECT" and select one or more of the names, e.g., "Miller," "Smith," etc., as the criteria values (240) for this criterion (235) within the responsibility area "RESP_AREA_OS." This means that the particular channel partner is responsible for sales prospects that are named "Miller" and "Smith."

The responsibility criteria (235) may provide a search term that the server 110 uses to find channel partners and their employees in the database table. The responsibility criteria (235) may be selected from a predetermined group, defined by the management system developer and stored in the server 110. Alternatively, the brand owner may create new responsibility criteria (235) and submit defining parameters thereof to the server 110, which may then set up a data structure for the new responsibility criteria (235). The criteria values (240) may provide an actual value for the responsibility criteria (235) that the server 110 analyzes during the search to determine whether a match has been found.

It is to be understood that the representation of the responsibility data is not limited to the data structures or the database table described herein, but may include any representation capable of storing and retrieving responsibility data.

FIG. 4 is a flowchart of a method for assigning responsibilities in accordance with an embodiment of the present invention. In this embodiment, server 110 may receive (405) a responsibility assignment from owner client 120 or partner client 100 regarding a channel partner or the channel partner's employees. The assignment may be to update a responsibility previously assigned or to add a new responsibility, for example. Server 110 may also receive (410) the data associated with the assignment, i.e., the particulars of the responsibility.

Server 110 may then determine (415) whether the assignment came from the brand owner or from the channel partner. If the assignment is from the brand owner, server 110 may assign (420) the responsibility to the channel partner or the channel partner's employee in the database table.

If server 110 determines (415) that the responsibility assignment came from the channel partner, server 110 may then assign (325) the responsibility to the channel partner's employee in the database table. In an embodiment of the present invention, the channel partner may view but not assign its own responsibilities. In an alternate embodiment, the channel partner may assign certain of its own responsibilities with permission from the brand owner.

Figure 5:
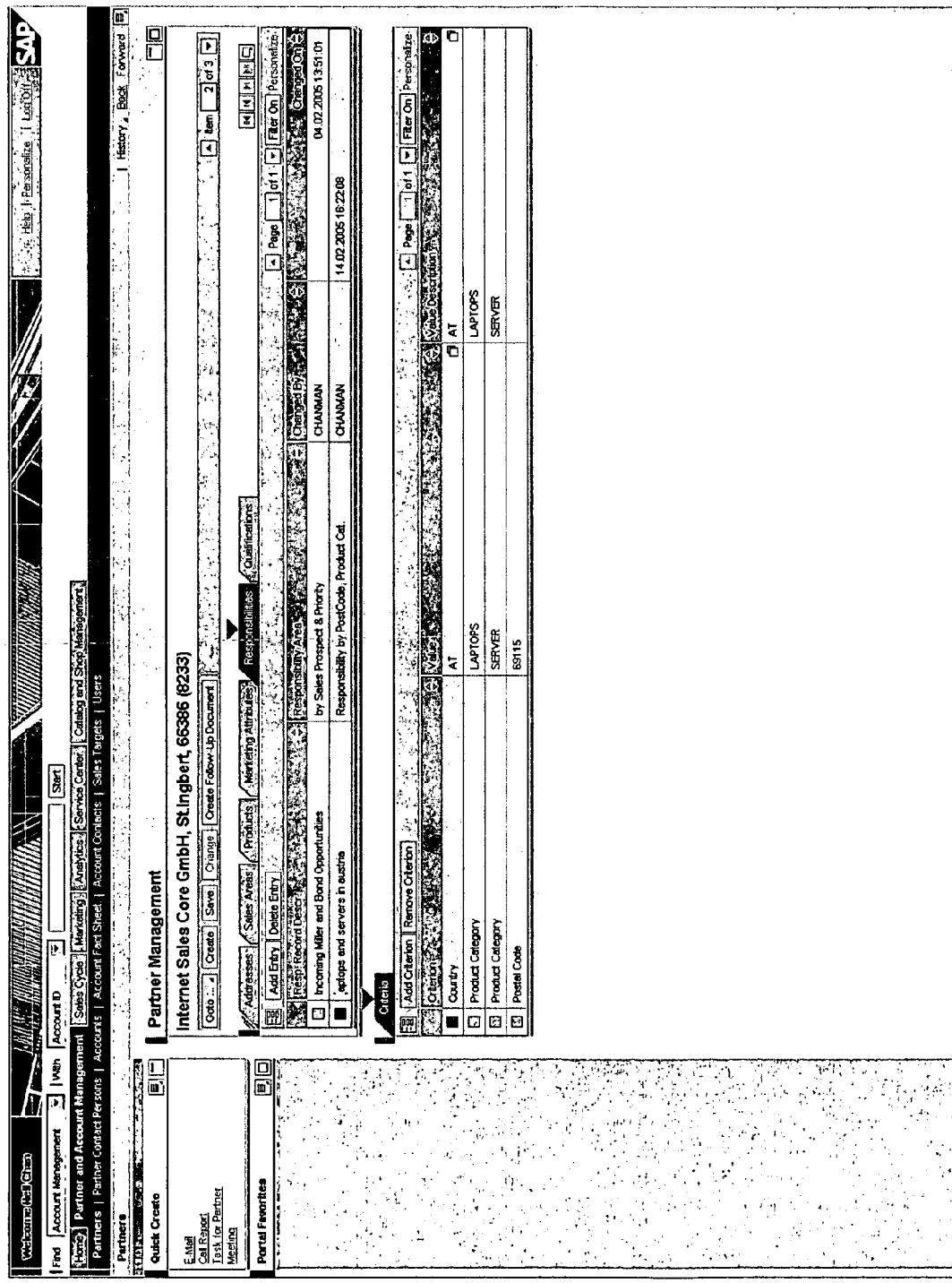
FIG. 5 is a screenshot that depicts a partner management screen as viewed by a brand owner that shows a channel partner's responsibilities and from which the brand owner may assign responsibilities to the channel partner or the channel partner's employees in accordance with an embodiment of the present invention.

FIG. 5 is a screenshot that depicts a partner management screen as viewed by a brand owner that shows a channel partner's responsibilities and from which the brand owner may assign responsibilities to the channel partner in accordance with an embodiment of the present invention. The screen shows the current responsibilities for this channel partner, listed under "Responsibilities." The screen further shows the responsibility criteria for responsibility "laptops and servers in austria," listed under "Criteria." If a brand owner wishes to assign a new responsibility to this channel partner, the brand owner could click on "Add Entry" to add the responsibility area that represents the new responsibility. The brand owner may then be prompted to add responsibility areas therein. If a brand owner wishes to add new responsibility criteria to an existing responsibility area, the brand owner could click on "Add Criterion" to add the responsibility criterion and criterion value. When the brand owner saves the criteria and criteria values, the responsibility area becomes a responsibility entity since it now have criteria values that are valid for the particular channel partner. Conversely, if a brand owner wishes to remove a responsibility criterion, the brand owner could click on "Remove Criterion." Similarly, if a brand owner wishes to remove a responsibility area, the brand owner could click on "Delete Entry," which would remove the responsibility area and corresponding responsibility criteria.

Figure 6:
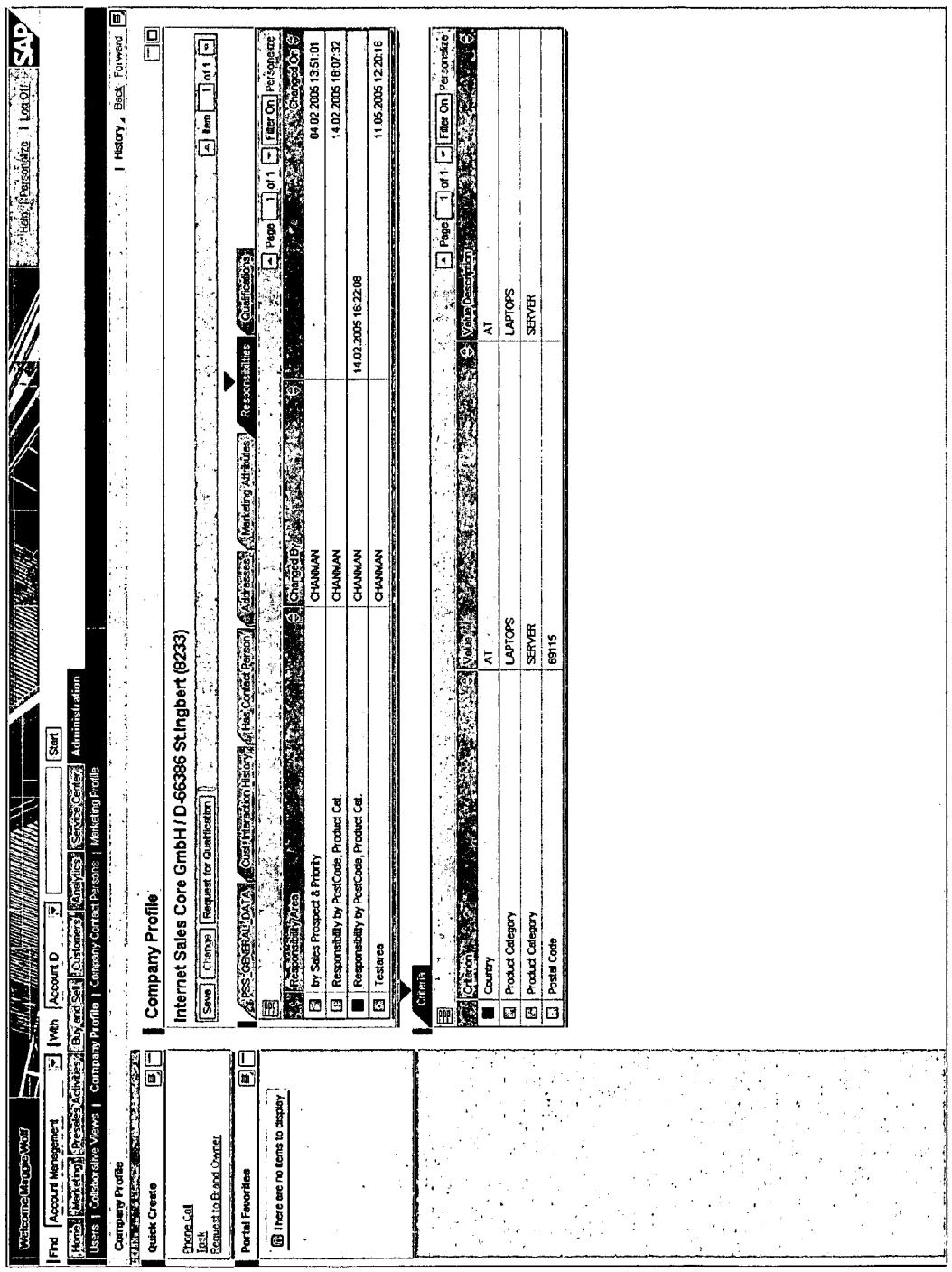
FIG. 6 is a screenshot that depicts a company profile screen as viewed by a channel partner that shows the channel partner's responsibilities in accordance with an embodiment of the present invention.

FIG. 6 is a screenshot that depicts a company profile screen as viewed by a channel partner that shows the channel partner's responsibilities in accordance with an embodiment of the present invention. The screen shows the current responsibility areas for the channel partner, listed under "Responsibilities." The screen further shows the responsibility criteria for the channel partner's third listed responsibility area, under "Criteria." Since the channel partner can not change these responsibilities, this screen does not include "Add Entry," "Delete Entry," "Add Criterion," and "Remove Criterion" buttons.

Figure 7:
FIG. 7 is a screenshot that depicts a contact persons screen as viewed by a channel partner that shows the channel partner's employee's responsibilities and from which the channel partner may assign the channel partner's employee's responsibilities in accordance with an embodiment of the present invention.

FIG. 7 is a screenshot that depicts a contact persons screen as viewed by a channel partner that shows the channel partner's employee's responsibilities and from which the channel partner may assign the channel partner's employee's responsibilities in accordance with an embodiment of the present invention. The screen shows the current responsibility areas for this channel partner's employee, listed under "Responsibilities." The screen further shows the responsibility criteria for the responsibility area, listed under "Criteria." As stated previously, a channel partner may assign responsibilities to the channel partner's employees. Thus, if a channel partner wishes to assign a new responsibility to this employee, the channel partner could click on "Add Entry" to add the responsibility area that represents the new responsibility. The channel partner may then be prompted to add responsibility criteria therein. If a channel partner wishes to add new responsibility criteria to an existing responsibility, the channel partner could click on "Add Criterion" to add the responsibility criterion and criterion value. When the channel partner saves the criteria and criteria values, the responsibility area becomes a responsibility entity since it now has values that are valid for this particular employee. Conversely, if a channel partner wishes to remove a responsibility criterion, the channel partner could click on "Remove Criterion." Similarly, if a channel partner wishes to remove a responsibility area, the channel partner could click on "Delete Entry," which would remove the responsibility area and corresponding responsibility criteria.

Similarly, a contact persons screen, like that shown in FIG. 7, may be viewed by a brand owner and used by the brand owner to assign responsibilities to a channel partner's employees in accordance with an embodiment of the present invention.

Figure 8:
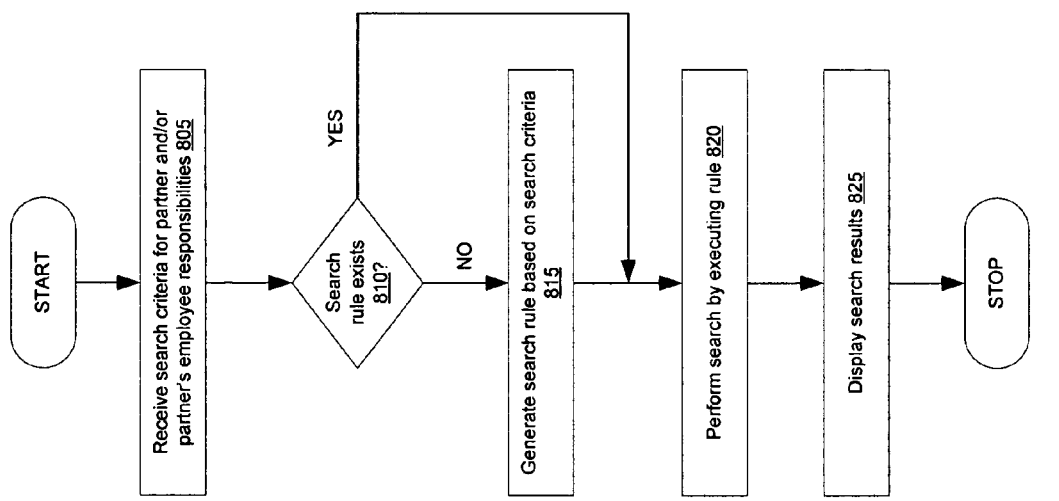
FIG. 8 is a flowchart of a method for searching for channel partners and/or channel partner's employees based on their responsibilities in accordance with an embodiment of the present invention.

FIG. 8 is a flowchart of a method for searching for channel partners and/or their employees based on responsibilities in accordance with an embodiment of the present invention. In order for a brand owner to gain the full benefit of the channel partner responsibility information (e.g., processing a forwarded sales lead or opportunity), the present invention enables the brand owner to search the responsibility information in the database table, as illustrated in FIG. 8. In this embodiment, server 110 may receive (805) search parameters based on desired partner responsibility information from brand owner client 120.

Server 110 may have pre-defined search rules that define searches that are typically conducted by brand owners to find best-fit channel partners and/or channel partners' employees. Examples of these pre-defined search rules include (a) searches for channel partners based on their responsibilities for country, zip code, or product categories, and (b) searches for channel partners' employees based on their responsibilities for a certain type of transaction.

Server 110 may determine (810) whether the search criteria correspond to a pre-defined search rule. If so, server 110 may use the pre-defined rule. Otherwise, server 110 may generate (815) a search rule based on the received search criteria. Server 110 may perform (820) the search using the search rule to find responsibility data that matches the search criteria. Server 110 may display (825) the list of channel partners and channel partner's employees who meet the search parameters.

Figure 9:
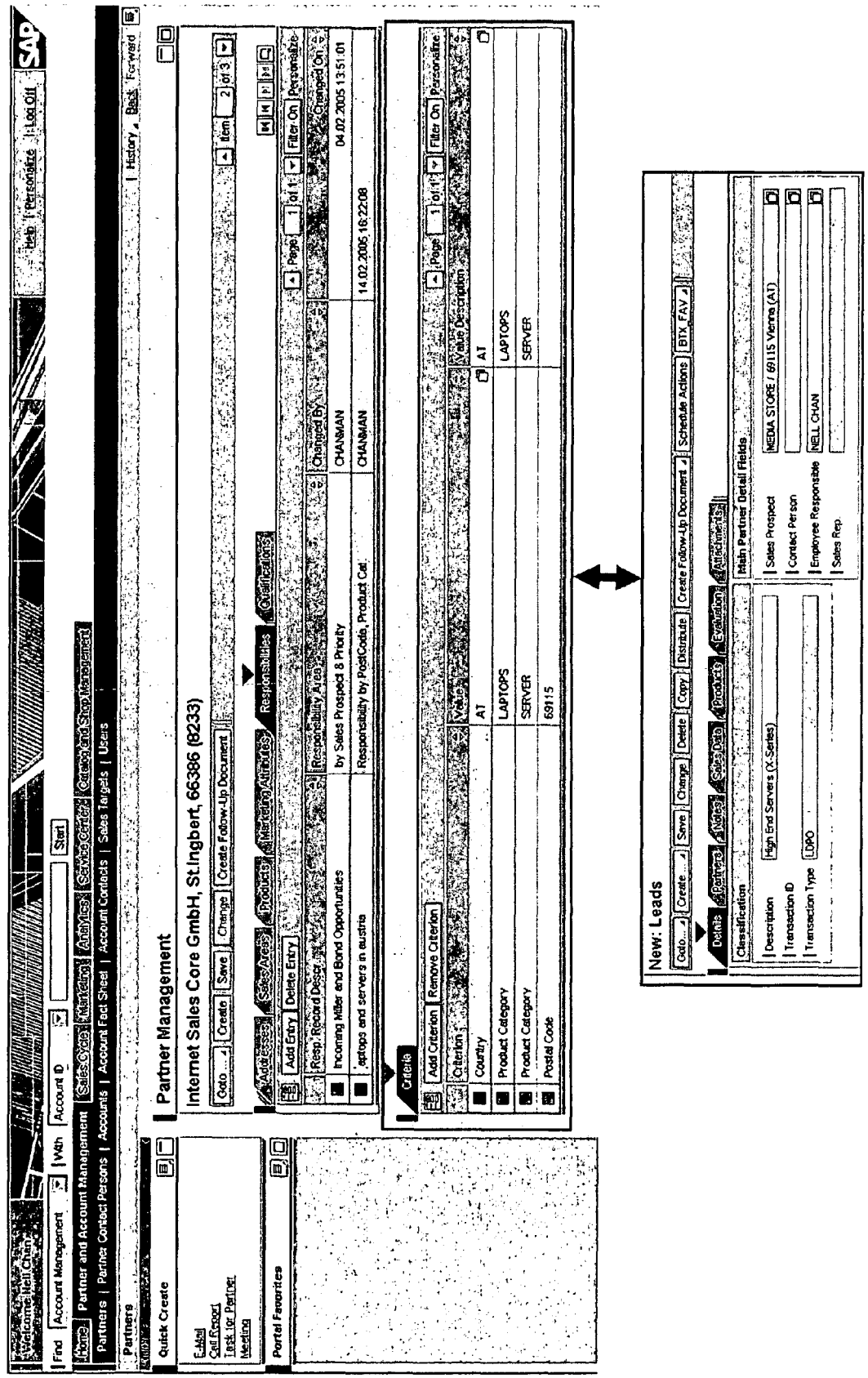
FIG. 9 is a screenshot that depicts partner management screen views as viewed by a brand owner illustrating a job that may be matched to a channel partner having the desired responsibilities in accordance with an embodiment of the present invention.

FIG. 9 is a screenshot that depicts two views of a partner management screen as viewed by a brand owner illustrating a job that may be matched to a channel partner having the desired responsibilities. The lower view shows that the brand owner had a new job (or lead) for potential sales of high end servers. In embodiments of the present invention, the brand owner may find out which channel partner would be the best-fit for handling this new job based on channel partner responsibilities. Accordingly, the brand owner may conduct a search for channel partners having responsibility for servers, as identified in the channel partner's product category criterion. The upper view shows that a match may be made with channel partner Internet Sales Core GmbH, which is responsible for servers. Accordingly, the brand owner may match and dispatch the job to the matched channel partner.

In an alternate embodiment, the dispatching may be done automatically. For example, when a new job comes in, a search may be triggered automatically and search criteria determined from the description or other data regarding the new job. Or the brand owner may trigger the search, but the dispatching may be done automatically when a match is found.

Figure 10:
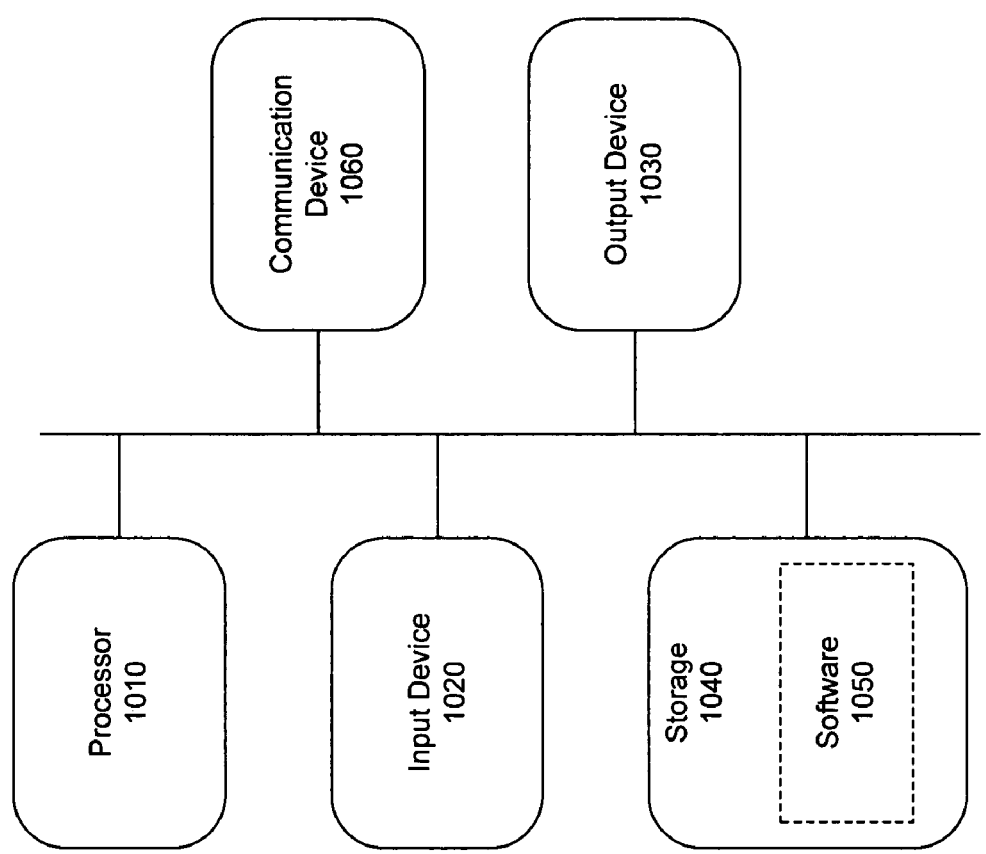
FIG. 10 is a block diagram that depicts a computing device in accordance with an embodiment of the present invention.

FIG. 10 illustrates the components of a basic computing device in accordance with an embodiment of the present invention, which may include partner client 100, partner management server 110, and owner client 120. The computing device may be a personal computer, workstation, handheld personal digital assistant ("PDA"), or any other type of microprocessor-based device. The computing device may include one or more of processor 1010, input device 1020, output device 1030, storage 1040, and communication device 1060.

Input device 1020 may include a keyboard, mouse, pen-operated touch screen or monitor, voice-recognition device, or any other device that provides input. Output device 1030 may include a monitor, printer, disk drive, speakers, or any other device that provides output.

Storage 1040 may include volatile and nonvolatile data storage, including one or more electrical, magnetic or optical memories such as a RAM, cache, hard drive, CD-ROM drive, tape drive or removable storage disk. Communication device 1060 may include a modem, network interface card, or any other device capable of transmitting and receiving signals over a network. The components of the computing device may be connected via an electrical bus or wirelessly.

Software 1050, which may be stored in storage 1040 and executed by processor 1010, may include, for example, the application programming that embodies the functionality of the present invention (e.g., as embodied in mySAP CRM 5.0). Software 1050 may include a combination of enterprise servers such as an application server and a database server.

Communication network 105 may include any type of interconnected communication system, which may implement any communications protocol, which may be secured by any security protocol. The corresponding network links may include telephone lines, DSL, cable networks, T1 or T3 lines, wireless network connections, or any other arrangement that implements the transmission and reception of network signals.

The computing device may implement any operating system, such as Windows or UNIX. Software 1050 may be written in any programming language, such as ABAP, C, C++, Java or Visual Basic. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention. For example, the data structures that implement the present invention can take many different forms yet still provide the same functionality.

What is claimed is:

1. A computer-implemented method for creating an integrated data record assigning a job to an entity of a channel partner using a processor and a communications network comprising:

storing channel partners data records corresponding channel partners of an enterprise in a first database, the channel partner data records comprising fields for identifiers of each channel partner, responsibility of the channel partner, employee of the channel partner, and responsibility of the employee;

storing responsibility area data records in a second database, each responsibility area data record comprising fields for identifiers of each responsibility area, responsibility criterion, and responsibility criterion value, where each responsibility area represents a different job to be performed, and each responsibility criterion and criterion value represent a condition for completing the respective job of the responsibility area identifier to which the responsibility criterion and criterion value identifiers are coupled;

receiving a responsibility area data record from the second database having a responsibility criterion to be assigned; upon receipt of the data record through the communications network, querying the first database, the processor identifying match(es) during the query between the responsibility area identifier in the second database and the channel partner responsibility identifier in the first database;

for the channel partner(s) that are responsible for the responsibility area, querying the channel partner identifier records to determine, through the processor, if the channel partner identifier records store data regarding the channel partner employee's responsibility;

when at least one channel partner employee responsibility identifier is identified by the processor as matching the responsibility area identifier in the second database:

storing the employee identifier in the second database, the employee identifier coupled to the matching responsibility area identifier in the second database; otherwise, when only the channel partner is responsible for the responsibility area:

storing the channel partner identifier in the second database, the channel partner identifier coupled to the matching responsibility area identifier in the second database;

notifying the channel partner of the job and the specific requirement through the communications network; and responsive to a designation by the channel partner of an employee within the channel partner responsible for completing the job received through the communications network, storing the employee identifier of the employee in the second database, the employee identifier coupled to the matching responsibility area identifier in the second database; and based on the results, creating the integrated data record in a third database including at least one of the channel partner and employee identifiers from the first database linked to the matching responsibility area, responsibility criterion, and responsibility criterion value identifiers from the second database.

2. The method of claim 1, wherein the channel partner markets, sells, or services products of a brand owner.

3. The method of claim 1, further comprising changing the channel partner identifier coupled to the matching responsibility area identifier in the second data structure by replacing the coupled channel partner identifier with a different channel partner identifier.

4. The method of claim 3, further comprising associating an additional responsibility area identifier by coupling the additional responsibility area identifier to the different channel partner identifier.

5. The method of claim 1, wherein the representation of the channel partner in the channel partner identifier is at a company level.

6. The method of claim 1, wherein the representation of the channel partner in the channel partner identifier is at an employee level.

7. The method of claim 1, wherein each of the data records is stored in an integrated database.

8. The method of claim 1, wherein the responsibility criterion relates to a category of products of the channel partner involving a brand owner.

9. The method of claim 1, wherein the responsibility criterion relates to a geographical area in which the channel partner markets, sells, or services products for a brand owner.

10. The method of claim 1, wherein the responsibility criterion relates to a type of business transaction that the channel partner performs for a brand owner.

11. An article of manufacture storing computer-executable instructions, which when executed by a processor, cause the processor to execute the management of channel partner responsibilities and create an integrated data record according to a method comprising the steps of:

storing channel partners data records corresponding channel partners of an enterprise in a first database, the channel partner data records comprising fields for identifiers of each channel partner, responsibility of the channel partner, employee of the channel partner, and responsibility of the employee;

storing responsibility area data records in a second database, each responsibility area data record comprising fields for identifiers of each responsibility area, responsibility criterion, and responsibility criterion value, where each responsibility area represents a different job to be performed, and each responsibility criterion and criterion value represent a condition for completing the respective job of the responsibility area identifier to which the responsibility criterion and criterion value identifiers are coupled;

receiving a responsibility area data record from the second database having a responsibility criterion to be assigned;

upon receipt of the data record through the communications network, querying the first database, the processor identifying match(es) during the query between the responsibility area identifier in the second database and the channel partner responsibility identifier in the first database;

for the channel partner(s) that are responsible for the responsibility area, querying the channel partner identifier records to determine, through the processor, if the channel partner identifier records store data regarding the channel partner employee's responsibility;

when at least one channel partner employee responsibility identifier is identified by the processor as matching the responsibility area identifier in the second database:

storing the employee identifier in the second database, the employee identifier coupled to the matching responsibility area identifier in the second database;

otherwise, when only the channel partner is responsible for the responsibility area:

storing the channel partner identifier in the second database, the channel partner identifier coupled to the matching responsibility area identifier in the second database;

notifying the channel partner of the job and the specific requirement through the communications network; and responsive to a designation by the channel partner of an employee within the channel partner responsible for completing the job received through the communications network, storing the employee identifier of the employee in the second database, the employee identifier coupled to the matching responsibility area identifier in the second database; and based on the results, creating the integrated data record in a third database including at least one of the channel partner and employee identifiers from the first database linked to the matching responsibility area, responsibility criterion, and responsibility criterion value identifiers from the second database.

12. The article of claim 11, wherein the responsibility criterion includes a product category.

13. The article of claim 11, wherein the responsibility criterion includes a geographical area.

14. The article of claim 11, wherein the responsibility criterion includes a type of transaction.

15. The article of claim 11, wherein the responsibility criterion includes a responsibility type and a value associated with the responsibility type.

* * * * *